(12) United States Patent
Kitai (10) Patent No.: US 8,705,113 B2
(45) Date of Patent: Apr. 22, 2014

(54) APPARATUS AND METHOD FOR RECORDING A MAINTENANCE PATTERN

(75) Inventor: Satoshi Kitai, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 294 days.

(21) Appl. No.: 12/958,251

(22) Filed: Dec. 1, 2010

(65) Prior Publication Data

US 2011/0286013 A1 Nov. 24, 2011

(30) Foreign Application Priority Data

May 24, 2010 (JP) .................................. 2010-118543

(51) Int. Cl.
*G06F 15/00* (2006.01)
*G06K 1/00* (2006.01)
*H04N 1/40* (2006.01)
*G06K 15/00* (2006.01)

(52) U.S. Cl.
USPC ............ 358/1.8; 358/1.9; 358/3.01; 358/3.23

(58) Field of Classification Search
None
See application file for complete search history.

(56) References Cited

U.S. PATENT DOCUMENTS

| | | | |
|---|---|---|---|
| 6,390,586 B1 | 5/2002 | Takahashi | |
| 2002/0063873 A1* | 5/2002 | Kakutani et al. | 358/1.8 |
| 2002/0080375 A1* | 6/2002 | Waldner et al. | 358/1.9 |
| 2004/0041868 A1* | 3/2004 | Maru et al. | 347/15 |
| 2004/0042047 A1* | 3/2004 | Kawatoko et al. | 358/3.06 |
| 2004/0141195 A1* | 7/2004 | Sasanuma et al. | 358/1.9 |
| 2004/0165022 A1* | 8/2004 | Kanda et al. | 347/15 |
| 2004/0184102 A1* | 9/2004 | Hiyoshi | 358/1.16 |
| 2006/0126135 A1* | 6/2006 | Stevens et al. | 358/504 |
| 2008/0043257 A1* | 2/2008 | Yamazaki et al. | 358/1.8 |

FOREIGN PATENT DOCUMENTS

| | | |
|---|---|---|
| JP | 10-081025 A | 3/1998 |
| JP | 2008-023759 A | 2/2008 |
| JP | 2008-213165 A | 9/2008 |

* cited by examiner

*Primary Examiner* — Ming Hon
(74) *Attorney, Agent, or Firm* — Canon U.S.A., Inc. IP Division

(57) ABSTRACT

A recording apparatus using a recording head having a first recording element array and a second recording element array for one color component includes a first memory configured to store a plurality of first patterns which correspond to first, second, and third gradation values and in which dot data is allocated to the first recording element array or the second recording element array, a second pattern which corresponds to fourth gradation value and in which dot data is allocated to the first recording element array, and a third pattern corresponds to fifth gradation value and in which dot data is allocated to the second recording element array, a data acquisition unit configured to acquire multi-valued data at the first, the second, the third, the fourth and the fifth gradation value, a generation unit configured to generate dot data based on the multi-valued data generated by the acquisition unit.

13 Claims, 11 Drawing Sheets

APPARATUS AND METHOD FOR RECORDING A MAINTENANCE PATTERN

BACKGROUND OF THE INVENTION

1. Field of the Invention

The present invention relates to a circuit configured to generate binary data from multi-valued data, and also to a recording apparatus including the circuit.

2. Description of the Related Art

Japanese Patent Application Laid-Open No. 10-81025 discusses a technique for receiving multi-valued data representing a gradation level from a host apparatus, and generating binary data from the multi-valued data by referring to a table of dot placement patterns.

A printer equipped with a full line type recording head prints check patterns for checking a preliminary discharge operation and for checking actual discharge between image regions to be recorded based on multi-valued data during a printing operation. Therefore, the printer needs to have a data generation circuit for generating not only image data for the printing operation but also a preliminary discharge pattern and a discharge check pattern. As the number of recording elements in the recording head increased, it is required that the preliminary discharge pattern and the discharge check pattern are generated more quickly. On the other hand, there is a demand for suppression of increase in a circuit size and complexity of a data processing circuit.

SUMMARY OF THE INVENTION

According to an aspect of the present invention, a recording apparatus for performing recording based on dot data using a recording head having a first recording element array and a second recording element array for one color component includes an input unit configured to input image data from outside, a first memory configured to store a table which includes a plurality of first dot patterns which correspond to at least each of first, second, and third gradation values and in which dot data included in a plurality of pieces of dot data is allocated to the first recording element array or the second recording element array, a second dot pattern which corresponds to fourth gradation value and in which a plurality of dot data is allocated to the first recording element array, and a third dot pattern corresponds to fifth gradation value and in which a plurality of dot data is allocated to the second recording element array, a first data acquisition unit configured to acquire multi-valued image data at the first, the second, and the third gradation values based on the image data input by the input unit, a second acquisition unit configured to acquire multi-valued image data at the fourth gradation value and the fifth gradation value, a second memory configured to store pieces of data generated by the first data acquisition unit and the second data acquisition unit, a generation unit configured to generate dot data based on the multi-valued image data stored in the second memory and the table, and a transfer unit configured to transfer the dot data generated by the generation unit to a recording head.

Further features of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE EMBODIMENTS

Various exemplary embodiments, features, and aspects of the invention will be described in detail below with reference to the drawings.

Figure 1:
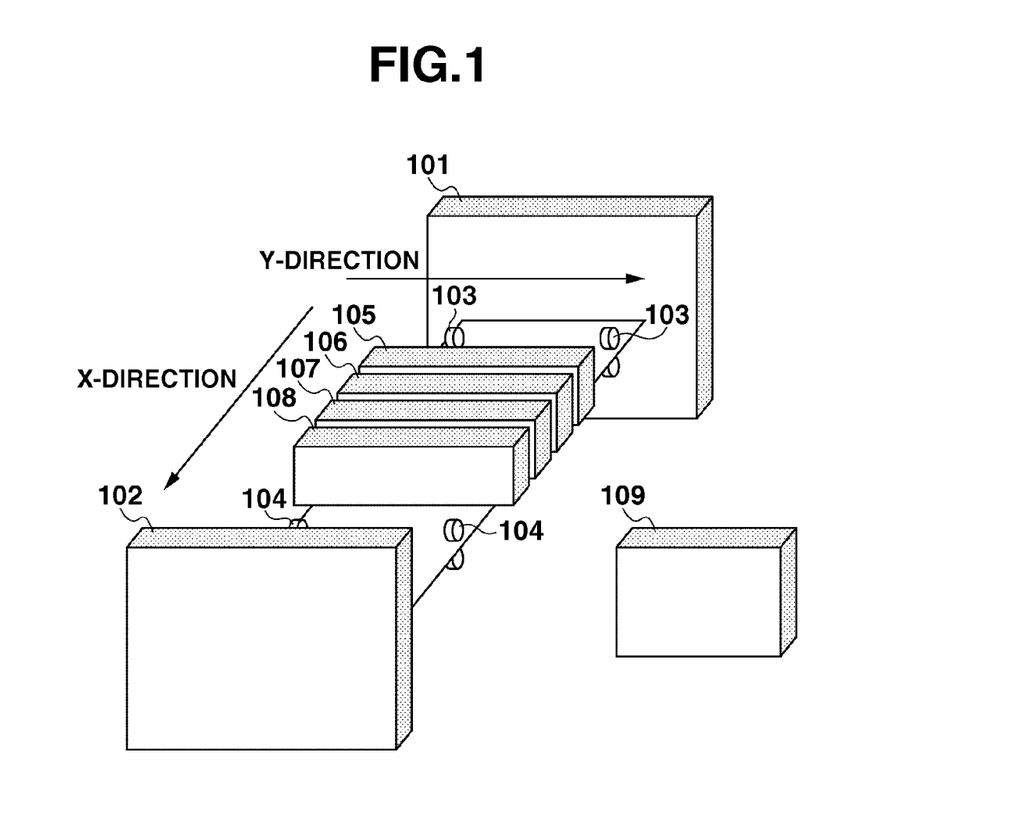
FIG. 1 is a schematic diagram illustrating an internal configuration of a printer (a recording apparatus) according to an exemplary embodiment of the present invention.

FIG. 1 is a schematic diagram illustrating an internal configuration of a printer (a recording apparatus) according to a first exemplary embodiment of the present invention. The printer includes a sheet feeding unit 101, a printing unit, and a discharging unit 102. The sheet feeding unit 101 stores and supplies a sheet (recording medium) wound in a roll. The printing unit includes print heads 105 to 108, and records an image on the sheet being conveyed. The printing unit also includes a plurality of conveyance rollers 103 and 104 that convey the sheet.

The print head is a line type print head equipped with recording elements arranged in a range to cover a maximum width of sheet assumed to be used. Each print head has four rows, that is, row A, row B, row C, and row D, of recording elements (nozzle arrays) in which a plurality of recording elements (nozzles) are aligned. More specifically, one print head for one color has four recording element arrays.

Figure 2:
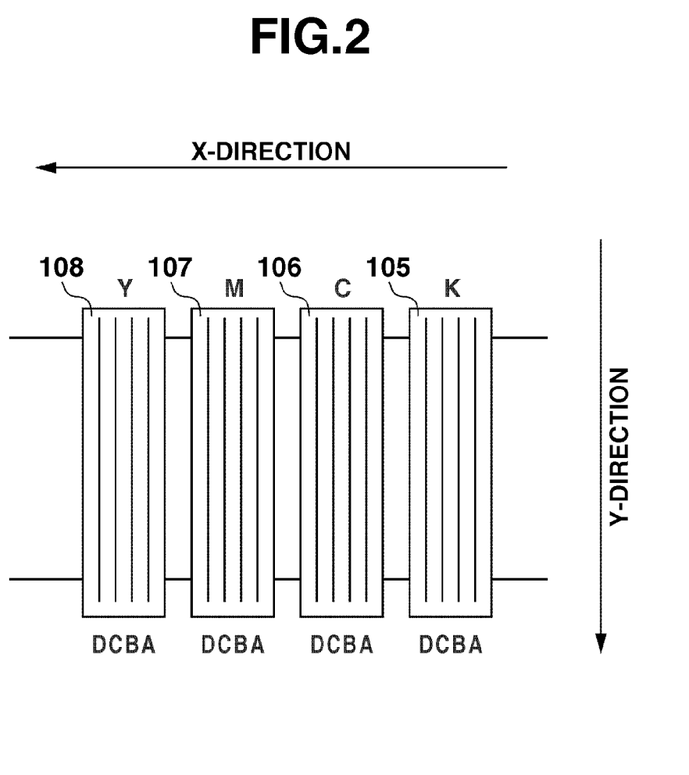
FIG. 2 illustrates a layout of print heads and recording elements.

As illustrated in FIG. 2, the print heads 105 to 108 are arranged in the X-direction. In each recording element array, a plurality of recording elements is aligned in the Y-direction. In the present exemplary embodiment, four print heads are arranged in the order of K (black), C (cyan), M (magenta), and Y (yellow) from an upstream side of a sheet conveyance direction. The number of colors and the print heads is not limited to four. The print head may be formed by arranging a plurality of chips on which a plurality of the nozzle arrays is arranged in a staggered pattern.

In the present exemplary embodiment, a type of the recording element is a heating element. However, the recording element may be any type using, for example, a piezoelectric element, an electrostatic element, and a microelectromechanical system (MEMS) element. Ink of each color is supplied to a corresponding print head through an ink tube from an ink tank, not illustrated. The sheet discharging unit 102 includes a cutter (not illustrated), and conveys a sheet cut by the cutter. Further, the sheet discharging unit 102 sorts the printed sheets into groups and discharges the groups of sheets into a plurality of trays (not illustrated) if necessary. A control unit 109 controls operations of the printer.

Figure 3:
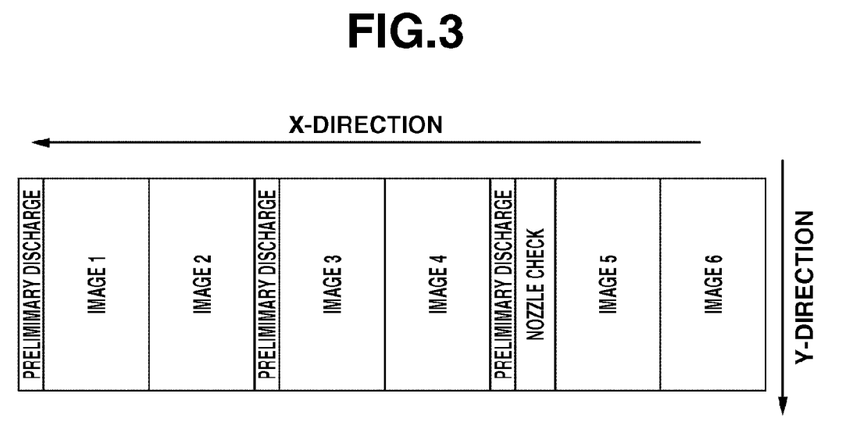
FIG. 3 illustrates how data is printed to a sheet.

FIG. 3 illustrates a printing operation to a sheet of paper. The printer performs preliminary discharge between images 2 and 3, and further performs preliminary discharge or discharge for a nozzle check between images 4 and 5.

Figure 4:
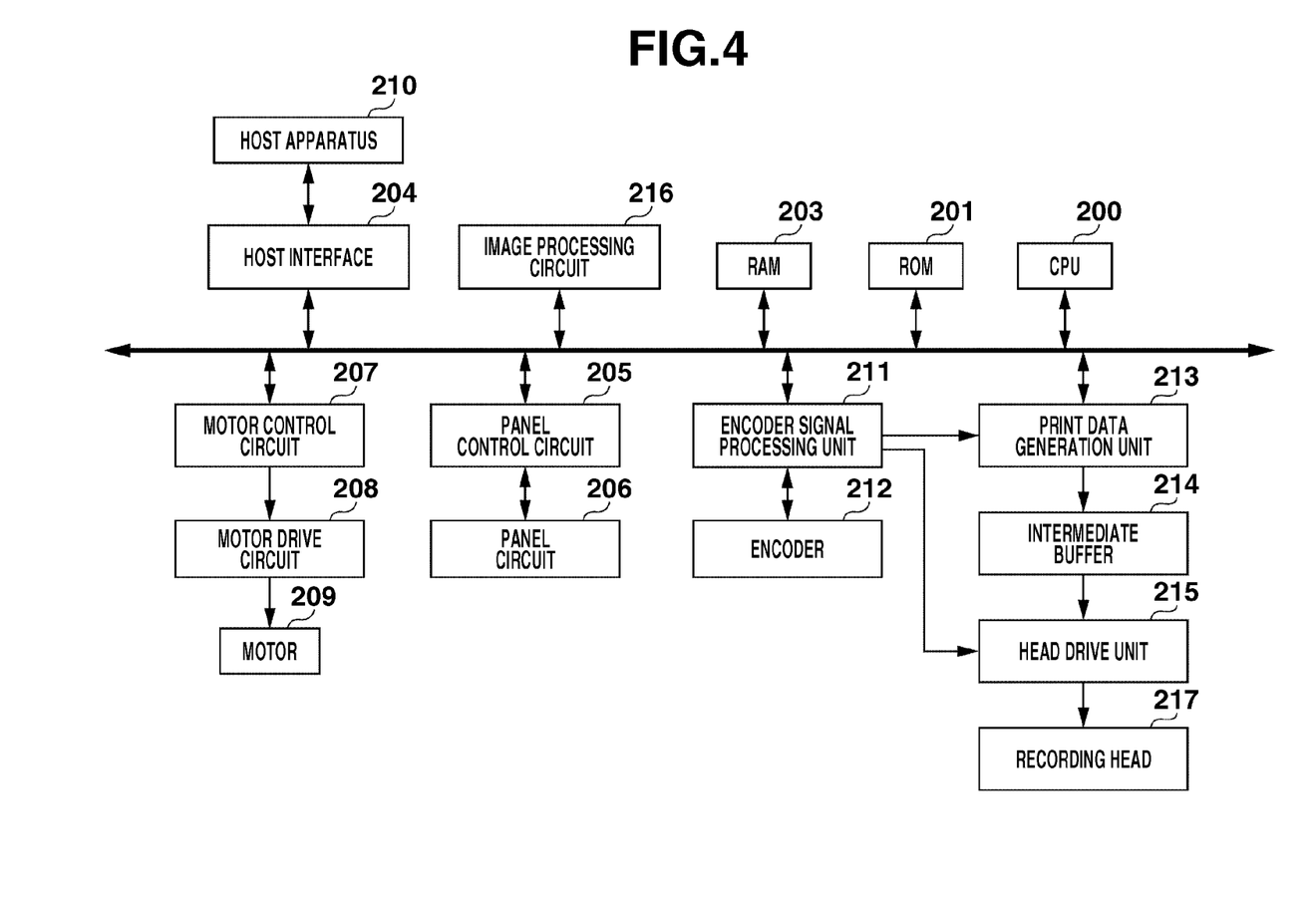
FIG. 4 is a control block diagram of a recording apparatus.

FIG. 4 illustrates a control block of the recording apparatus. A host apparatus 210 specifies an image to be printed and transmits a print start command to the recording apparatus. Image data is transmitted via an interface circuit 204 and stored in a reception buffer in a random access memory (RAM) 203.

The image data in this case is red-green-blue (RGB) luminance data which has resolution of 600 dpi (X-direction)×600 dpi (Y-direction) and is represented by 8 bits (256 gradations) for each pixel. When the image data of a predetermined amount is stored in the RAM 203, the image processing circuit 216 starts to operate, converts the RGB image data into multi-valued density data corresponding to color components (such as cyan (C), magenta (M), yellow (Y), and black (K)), and stores the density data in a print buffer in the RAM 203.

As described above, the image processing circuit 216 generates density data (multi-valued data). The density data is 4-bit data that can be processed by a data generation circuit 213. Maintenance patterns (a preliminary discharge pattern, a nozzle check pattern), which are described below, are transmitted from the host apparatus and processed in a manner similar to the image data, and stored in the print buffer.

In addition to inputting from an external apparatus, such as the host apparatus, the maintenance patterns may be stored in a read-only memory (ROM) 201 and processed by the print data generation circuit (print data generation unit) 213 or the image processing circuit 216 to generate density data in response to an instruction from an operation unit of the recording apparatus or a command from a control program of a printing operation. The generated density data may be stored in the print buffer.

Figure 5:
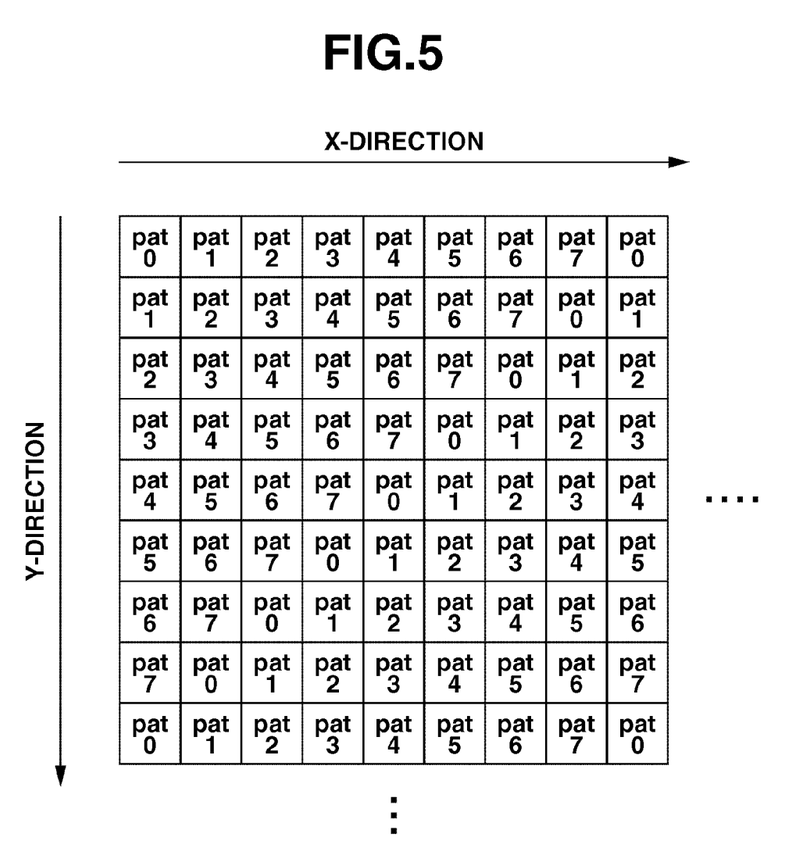
FIG. 5 is a conceptual diagram illustrating a placement of dot patterns used for converting the density data (multi-valued image data) stored in the print buffer into dot data.

FIG. 5 is a conceptual diagram illustrating a placement of dot patterns used for converting the density data stored in the print buffer into dot data. When the density data of a predetermined amount is stored in the print buffer, the print data generation unit 213 generates binary data (dot data) from the density data. The data generation operation is synchronized with a conveyance operation of a sheet. The print data generation unit 213 stores the dot data in an intermediate buffer (a transfer buffer, a second buffer) 214. A transfer unit reads the dot data stored in the intermediate buffer, and transfers the dot data to a recording head. The recording head is driven by a signal from a head drive unit and discharges ink.

Figure 6:
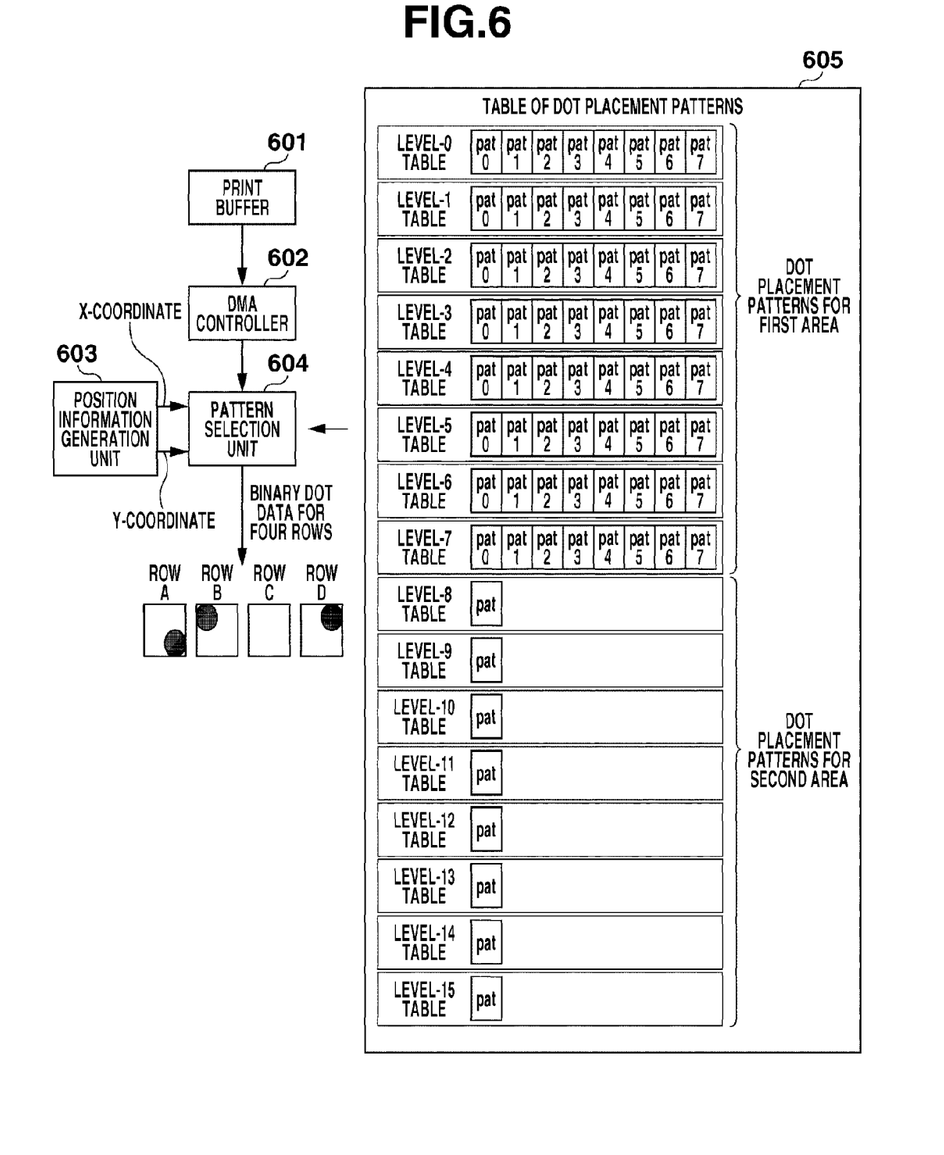
FIG. 6 illustrates a configuration of a data generation circuit.

FIG. 6 illustrated a configuration of the print data generation unit 213. As illustrated in FIG. 5, a direct memory access (DMA) controller 602 reads density data from a print buffer 601 in the RAM 203, and transfers the density data to a pattern selection unit 604. The pattern selection unit 604 selects dot patterns from a table 605 based on position information from a position information generation unit 603. The table 605 has 8 dot patterns (pat0 to pat7) at each gradation level for 8 gradations (8-step density levels from level 0 (value 0) to level 7 (value 7)) of multi-valued data. A first range (area) is defined between value 0 to value 7 of the multi-valued data.

Therefore, by referring to the table, a dot pattern of 1200 dpi (X-direction)×1200 dpi (Y-direction) can be obtained from a piece of multi-valued data. In other words, four dot patterns are generated from a piece of density data (multi-valued data). The pattern selection unit 604 can obtain different patterns (binary data placements) even from data at the same gradation. The pattern is formed by binary data (dot data) allocated to the row A to the row D.

For example, in FIG. 6, one black dot is allocated to each of the row A, the row B, and the row D, and no dot is allocated to the row C. The black dot indicates a pixel to be recorded by a recording element. A pixel without the black dot indicates the pixel not recorded by the recording element.

Figure 7A:
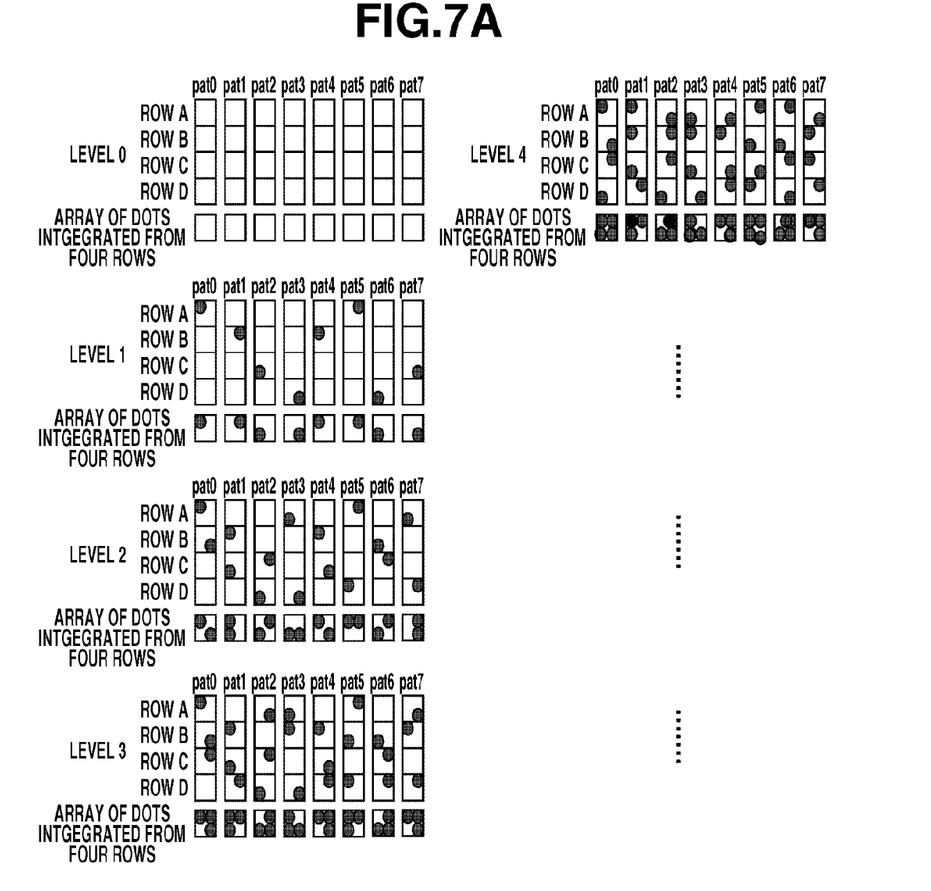
FIGS. 7A, 7B, and 7C illustrate how dot data is allocated to a nozzle array (a recording element array).

FIG. 7A illustrates of allocation of dots to nozzle arrays taking gradation levels (level 0 to level 7) of the multi-valued data for example. For example, in a level 1, each pattern is for recording one dot by four nozzle arrays. In a level 2, each pattern is for recording two dots by four nozzle arrays.

Figure 7B:
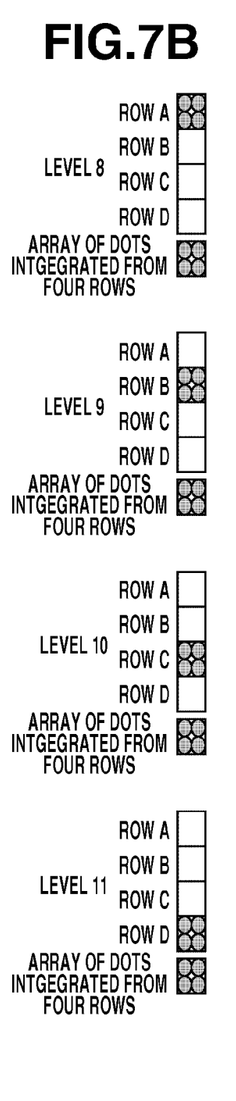

In FIG. 7B, predetermined patterns are provided for density data corresponding to a level 8 (value 8) to a level 11 (value 11). A second range (area) in table605 (FIG. 6) is defined between value 8 to value 11 of the density data. The values 8 to 11 of the density data is not related to density levels, and are treated as information for specifying a recording element array to be allocated.

For example, in FIG. 7B, in the level 8, dots are allocated to the row A (null data is allocated to the other nozzle arrays). In the level 9, dots are allocated to the row B (null data is allocated to the other nozzle arrays). Similarly, in the level 10, dots are allocated to the row C, and in the level 11, dots are allocated to the row D.

Figure 8:
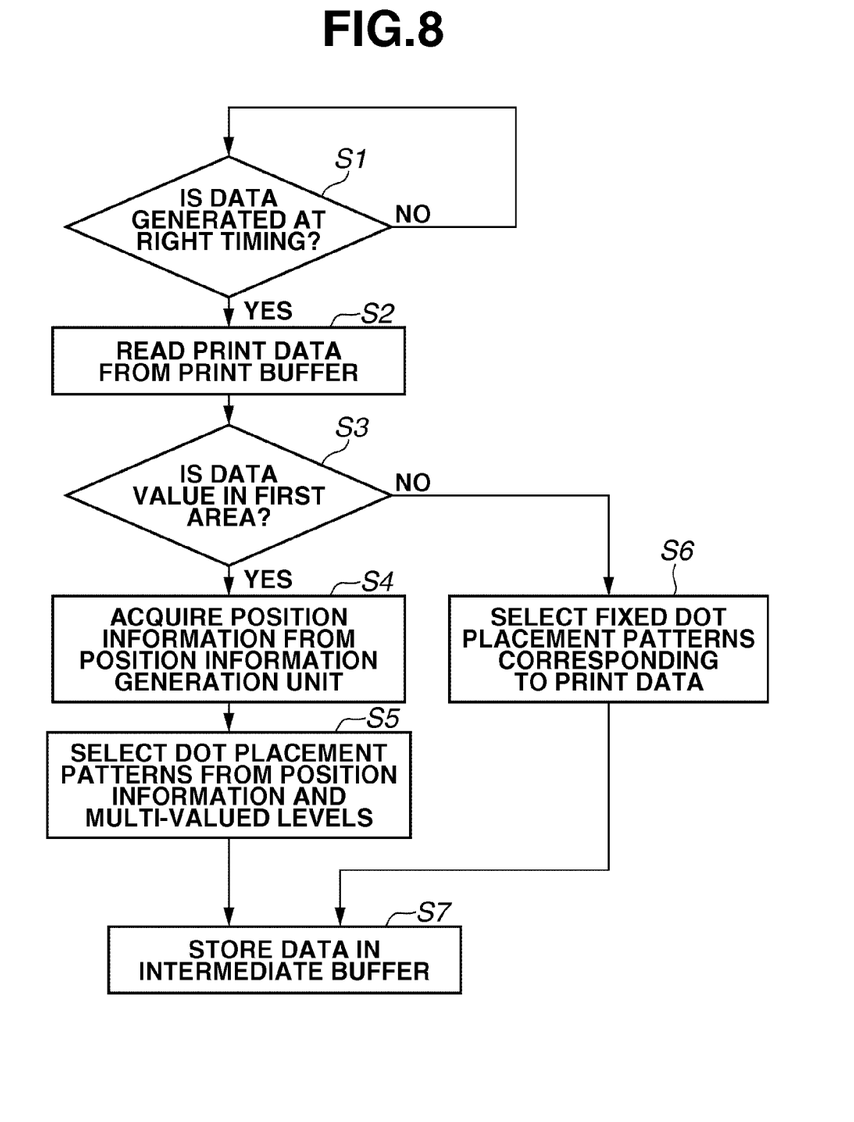
FIG. 8 is a flowchart illustrating an operation sequence executed by the data generation circuit.

FIG. 8 is a flowchart illustrating a sequence executed when the print data generation unit 213 generates dot data. In step S1, when a sheet is conveyed, an encoder mounted to a conveyance unit generates a pulse signal synchronized with the conveyance. When the sheet is conveyed to a predetermined position (YES in step S1), then in step S2, a predetermined amount of density data (multi-valued data) is read from the print buffer.

In step S3, it is determined whether a value of the read density data is within the first range (area). If the density data is within the first range (YES in step S3), in step S4, position information is obtained. Then in step S5, a dot placement pattern is obtained based on the position information and the value of density data.

On the other hand, if the density data is in the second range (area) (NO in step S3), then in step S6, a pattern of nozzle arrays corresponding to the value of density data is obtained.

Then in step S7, binary data (dot data) corresponding to the obtained pattern is stored in the intermediate buffer. In this case, as for processing to different column positions, if a raster position (X-position) is the same, it is only necessary to perform processing to store the same data.

As described above, if the density data is in the second range (area), the dot data is allocated selectively to each recording element array. The intermediate buffer has a buffer corresponding to each nozzle array, and the print data generation unit 213 stores the binary data to each buffer.

Figure 9:
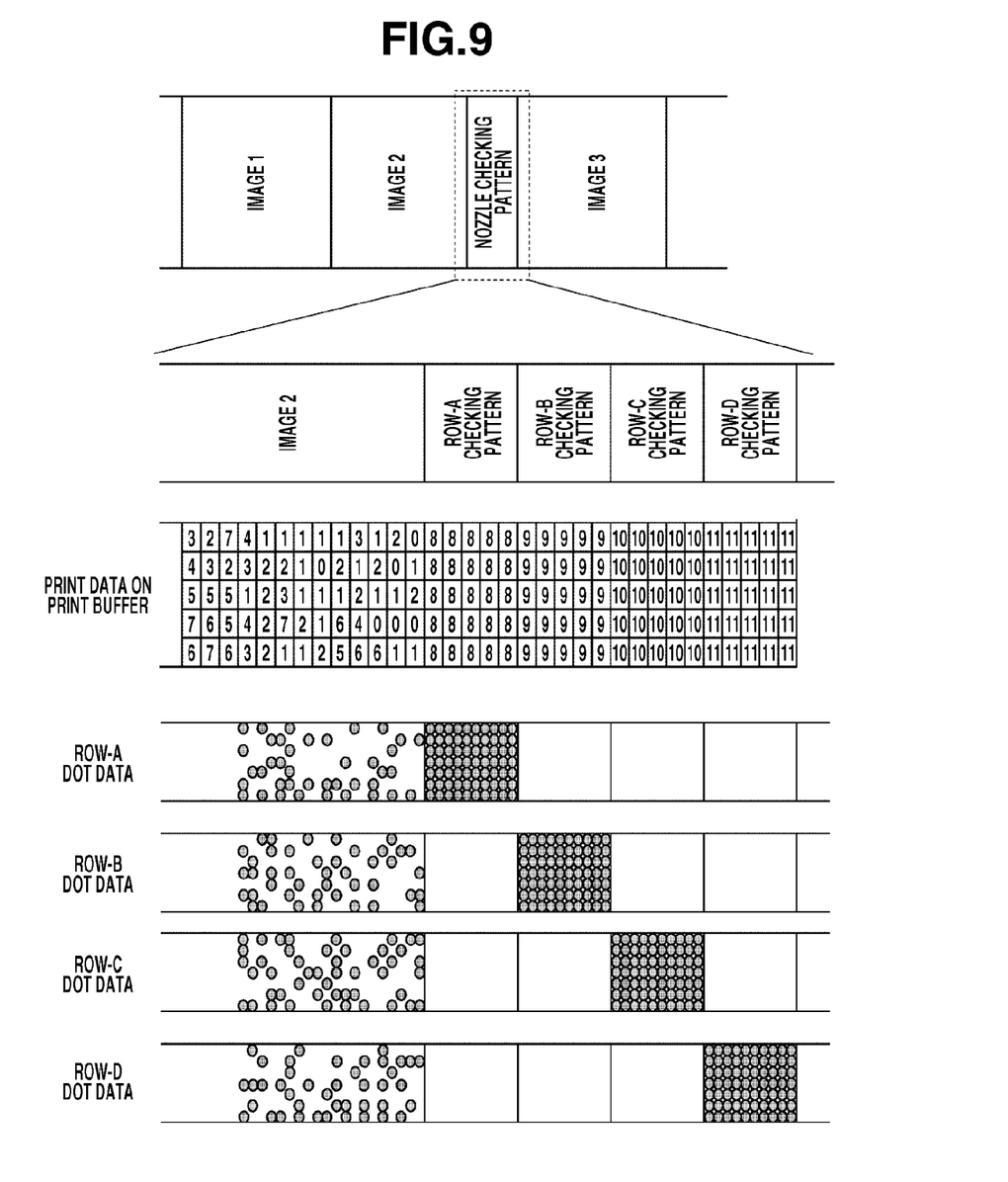
FIG. 9 illustrates how data is printed to a sheet.

FIG. 9 illustrates a correspondence relation among an area to be recorded on a sheet, an address area where multi-valued data corresponding to the record area is stored in the print buffer, and a position of dot data generated according to density data.

FIG. 9 also illustrates how an image 1, an image 2, a nozzle check pattern, and an image 3 are recorded in sequence on a sheet. In recording of the nozzle check pattern, a row-A check pattern, a row-B check pattern, a row-C check pattern, and a row-D check pattern are recorded in this order. For example, the print buffer stores density data of value 8 for the row-A check pattern, and multi-valued data of value 9 for the row-B check pattern.

Figure 7C:
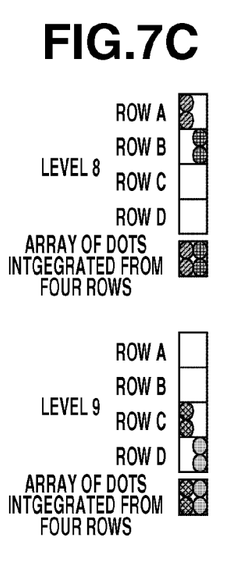

In the first exemplary embodiment described above, a second area pattern in the table illustrated in FIG. 6 is not limited to the patterns illustrated in FIG. 7B, and may be a pattern for preliminary discharge illustrated in FIG. 7C.

Figure 10:
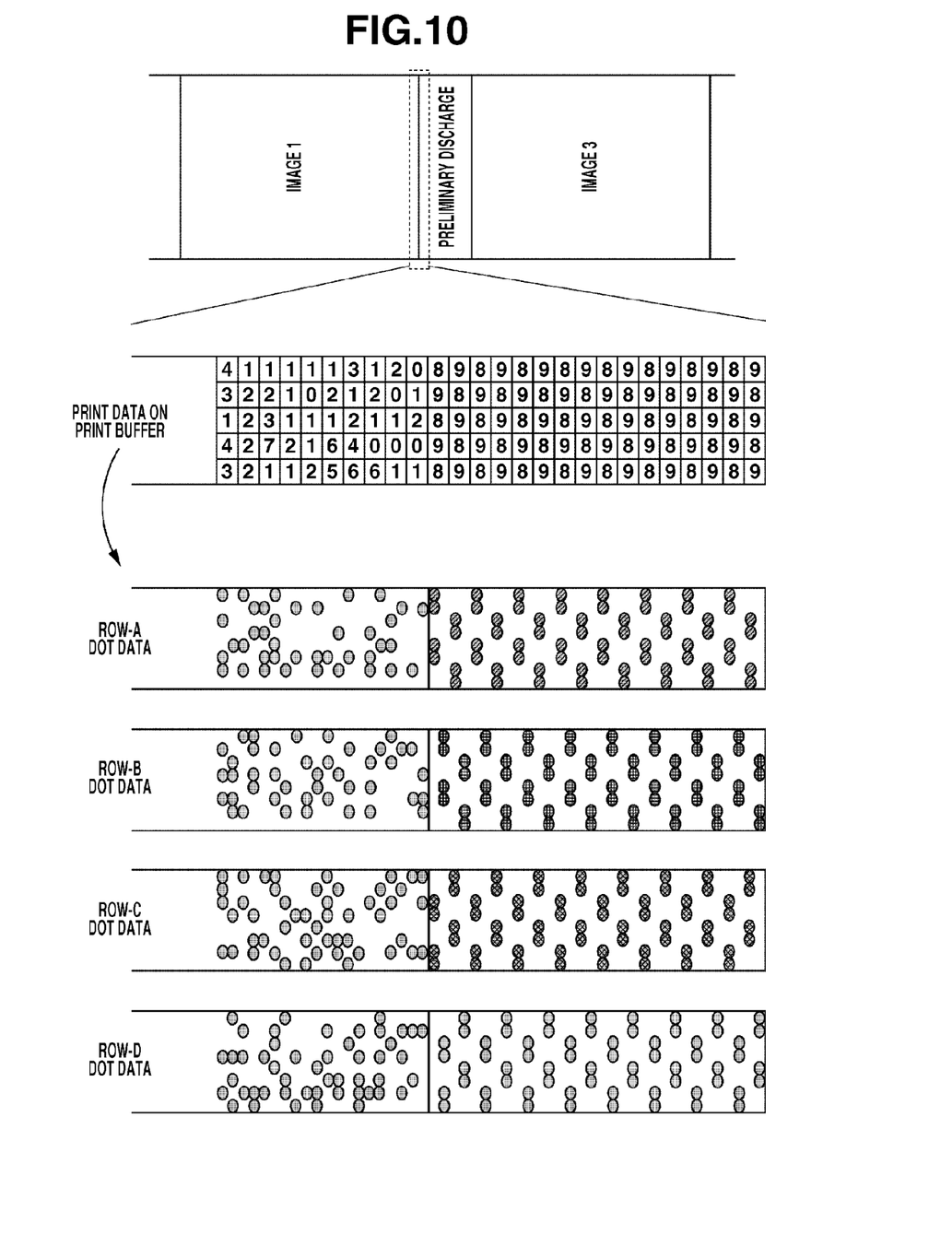
FIG. 10 illustrates how data is printed to a sheet.

In the patterns in FIG. 7C, in the case of density data in a level 8, predetermined patterns are allocated to two recording element arrays (row A and row B). In the case of density data in a level 9, predetermined patterns are allocated to two recording element arrays (row C and row D). FIG. 10 illustrates an example using patterns in FIG. 7C. FIG. 10 is similar to FIG. 9.

In the sequence in which the print data generation unit 213 generates dot data as described referring to FIG. 8, when the value of the read density data is determined, a dot placement pattern may be obtained based on position information and the value of the density data without determining the range (area) of the density data.

The values used in description of the present invention are not limited to those described in the first exemplary embodiment. The number of the recording element arrays in the recording head is not limited to four, and at least two or more recording element arrays may be used.

In addition, the number of bits of multi-valued data or the number of gradations are not limited. For example, gradation values of the density data has only to be at least three values (0, 1, and 2, for example). In this case, if the recording head includes two recording element arrays, as for the gradation values of nozzle check patterns, the gradation value corresponding to the first recording element array may be three, and the gradation value corresponding to the second recording element array may be four.

Moreover, there are no limitations to a size of a dot pattern and resolution of data. The resolution may be 300 dpi or 2400 dpi, for example. The table may include an area corresponding to a check pattern and a pattern for preliminary discharge, and may also include other patterns. Further, the patterns in FIGS. 7B and 7C may be set in the second range by determining a level.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-118543 filed May 24, 2010, which is hereby incorporated by reference herein in its entirety.

What is claimed is:

1. An apparatus comprising:
   a first input unit configured to input, based on image data, multi-valued data of which a gradation level is within a first range;
   a second input unit configured to input multi-valued data to which a gradation level within a second range is allocated corresponding to a maintenance pattern used for performing maintenance of a printing unit, the second range being different and exclusive from the first range such that the first range is not a subset of the second range;
   a holding unit configured to hold first information for specifying a plurality of dot patterns corresponding to the multi-valued data of which the gradation level is within the first range in a first area and hold second information for specifying at least one dot pattern corresponding to the multi-valued data of which the gradation level is within the second range in a second area; and
   an acquisition unit configured to acquire at least one dot pattern corresponding to the multi-valued data of which the gradation level is within the first range or the multi-valued data of which the gradation level is within the second range based on the first information held by the holding unit or the second information held by the holding unit.

2. The apparatus according to claim 1, further comprising a specifying unit configured to specify position information for recording the dot data to be generated based on the dot pattern acquired by the acquisition unit,
   wherein, in case of acquiring the dot patterns corresponding to the multi-valued data input by the first input unit, the acquisition unit acquires the dot patterns corresponding to the multi-valued data input by the first input unit based on the first information held by the holding unit and the position information specified by the specifying unit.

3. The apparatus according to claim 1, wherein each of the dot patterns acquired based on the first information or the dot patterns acquired based on the second information is a pattern for generating a plurality of dot data from one piece of multi-valued data 4. The apparatus according to claim 1,
   wherein the dot patterns are used for performing recording using a plurality of recording element arrays included in the printing, and
   wherein each of the first information and the second information held by the holding unit specifies a dot pattern corresponding to each gradation level and specifies to which recording element array, from among the plurality of recording element arrays, one or more dots is to be allocated based on the dot pattern.

5. The apparatus according to claim 4, wherein the dot pattern, corresponding to the multi-valued data of which the gradation level is within the second range in a second area, is a pattern for generating a plurality of dot data, wherein one or more dots are allocated to one or more recording element arrays and no dot is allocated to other recording element arrays according to the plurality of pieces of dot data.

6. The apparatus according to claim 4, wherein the gradation level of the first range corresponds to a density level and the gradation level of the second range does not correspond to a density level.

7. The apparatus according to claim 1, wherein the dot patterns corresponding to the multi-valued data of which the gradation level is within the second range are dot patterns which are to be allocated to any of the plurality of recording element arrays.

8. The apparatus according to claim 7, wherein the plurality of recording element arrays is used for performing recording for one color component.

9. The apparatus according to claim 1, further comprising a generation unit configured to generate dot data corresponding to the dot patterns acquired by the acquisition unit.

10. The apparatus according to claim 9, further comprising a buffer configured to store the dot data generated by the generation unit.

11. The apparatus according to claim 9, further comprising a recording head configured to perform recording using the dot data generated by the generation unit.

12. The apparatus according to claim 1, wherein the maintenance pattern is a preliminary discharge pattern and/or a nozzle check pattern.

13. A method comprising;
    inputting, based on image data, multi-valued data of which a gradation level is within a first range;
    inputting multi-valued data to which a gradation level within a second range is allocated corresponding to a maintenance pattern used for performing maintenance of a printing unit, the second range being different and exclusive from the first range such that the first range is not a subset of the second range;

holding first information for specifying a plurality of dot patterns corresponding to the multi-valued data of which the gradation level is within the first range in a first area and holding second information for specifying at least one dot pattern corresponding to the multi-valued data of which the gradation level is within the second range in a second area; and acquiring at least one dot pattern corresponding to the multi-valued data of which the gradation level is within the first range or the multi-valued data of which the gradation level is within the second range based on the first information held in the first area or the second information held in the second area.

* * * * *